(12) United States Patent
Lu

(10) Patent No.: US 7,654,749 B2
(45) Date of Patent: Feb. 2, 2010

(54) FIBER CONNECTOR AND ADAPTER

(75) Inventor: Liang-Ju Lu, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/316,583

(22) Filed: Dec. 11, 2008

(65) Prior Publication Data

US 2009/0199398 A1    Aug. 13, 2009

Related U.S. Application Data

(63) Continuation of application No. 12/150,696, filed on Apr. 29, 2008, now Pat. No. 7,503,702, which is a continuation of application No. 11/811,969, filed on Jun. 12, 2007, now Pat. No. 7,384,201, which is a continuation of application No. 11/543,718, filed on Oct. 5, 2006, now Pat. No. 7,246,950, which is a continuation of application No. 11/092,317, filed on Mar. 29, 2005, now Pat. No. 7,118,288, which is a continuation of application No. 10/213,350, filed on Aug. 5, 2002, now Pat. No. 6,910,807, which is a continuation of application No. 09/921,526, filed on Aug. 3, 2001, now Pat. No. 6,471,416, which is a continuation of application No. 09/583,681, filed on May 30, 2000, now Pat. No. 6,296,398, which is a continuation of application No. 09/394,303, filed on Sep. 10, 1999, now Pat. No. 6,076,973, which is a continuation of application No. 09/207,838, filed on Dec. 8, 1998, now Pat. No. 5,984,531, which is a continuation of application No. 08/859,533, filed on May 20, 1997, now Pat. No. 5,883,995.

(51) Int. Cl.
*G02B 6/38*    (2006.01)

(52) U.S. Cl. .............................. 385/60; 385/53; 385/72; 385/75; 385/77; 385/78; 385/139

(58) Field of Classification Search ................... 385/53, 385/60, 63, 55, 59, 64, 65, 70, 75, 76, 77, 385/78, 82, 83, 139, 86, 87, 84
See application file for complete search history.

(56) References Cited

U.S. PATENT DOCUMENTS 4,277,135 A    7/1981    Schrott et al. .............. 385/53 X (Continued)

FOREIGN PATENT DOCUMENTS

DE    296 4 436 U1    11/1996    ................ 385/53 X (Continued)

OTHER PUBLICATIONS

Aug. 1996 issue of *Light Wave* magazine.

(Continued)

*Primary Examiner*—Brian M Healy
(74) *Attorney, Agent, or Firm*—Merchant & Gould P.C.

(57) ABSTRACT

Fiberoptic connector and adapter assembly includes a fiberoptic connector received within an adapter. The connector has a cover on the connector housing. The cover pivots between open and closed positions to expose or cover, respectively, a optical fiber contained within the connector. Longitudinal guides of the connector are received cooperating with longitudinal guides of the adapter to direct the connector into the adapter in a prescribed alignment. A cam pin is carried on the adapter to engage a cam pin receiving slot on the cover to urge the cover to the open position as the connector is inserted into the adapter.

14 Claims, 16 Drawing Sheets

U.S. PATENT DOCUMENTS

| | | | |
|---|---|---|---|
| 4,611,887 A | 9/1986 | Glover et al. | 385/53 X |
| 4,986,626 A | 1/1991 | Bossard | 385/53 X |
| 5,016,968 A | 5/1991 | Hammond et al. | 385/53 X |
| 5,052,775 A | 10/1991 | Bossard et al. | 385/76 |
| 5,123,071 A | 6/1992 | Mulholland et al. | 385/53 |
| 5,142,597 A | 8/1992 | Mulholland et al. | 385/56 |
| 5,146,525 A | 9/1992 | Tabone | 385/78 |
| 5,166,995 A | 11/1992 | Briggs et al. | 385/58 |
| 5,212,752 A | 5/1993 | Stephenson et al. | 385/78 |
| 5,224,186 A | 6/1993 | Kishimoto et al. | 385/78 |
| 5,317,663 A | 5/1994 | Beard et al. | 385/70 |
| 5,333,221 A | 7/1994 | Briggs et al. | 385/55 |
| 5,335,301 A | 8/1994 | Newman et al. | 385/75 |
| 5,337,385 A | 8/1994 | Baderschneider et al. | 385/59 |
| 5,348,487 A | 9/1994 | Marazzi et al. | 439/138 |
| 5,363,460 A | 11/1994 | Marazzi et al. | 385/70 |
| 5,373,574 A | 12/1994 | Marazzi | 385/78 |
| 5,390,269 A | 2/1995 | Palecek et al. | 385/78 |
| 5,420,951 A | 5/1995 | Marazzi et al. | 385/75 |
| 5,461,690 A | 10/1995 | Lampert | 385/100 |
| 5,481,634 A | 1/1996 | Anderson et al. | 385/76 |
| 5,506,922 A | 4/1996 | Grois et al. | 385/75 |
| 5,577,146 A | 11/1996 | Musk | 385/92 |
| 5,579,425 A | 11/1996 | Lampert et al. | 385/55 |
| 5,638,474 A | 6/1997 | Lampert et al. | 385/78 |
| 5,692,080 A | 11/1997 | Lu | 385/60 |
| 5,768,455 A | 6/1998 | Konik | 385/86 |
| 5,883,995 A | 3/1999 | Lu | 385/60 |
| 5,946,436 A | 8/1999 | Takashi | 385/60 |
| 5,984,531 A | 11/1999 | Lu | 385/60 |
| 6,076,973 A | 6/2000 | Lu | 385/60 |
| 6,081,647 A | 6/2000 | Roth et al. | 385/139 |
| 6,296,398 B1 | 10/2001 | Lu | 385/60 |
| 6,471,416 B2 | 10/2002 | Lu | 385/60 |
| 6,591,056 B1 | 7/2003 | Wall et al. | 385/147 |
| 6,910,807 B2 | 6/2005 | Lu | 385/60 |
| 7,118,288 B2 | 10/2006 | Lu | 385/60 |
| 7,246,950 B2 | 7/2007 | Lu | 385/60 |
| 7,384,201 B2 | 6/2008 | Lu | 385/60 |
| 7,503,702 B2 | 3/2009 | Lu | 385/60 |
| 2007/0253666 A1 | 11/2007 | Lu | 385/60 |
| 2008/0279507 A1* | 11/2008 | Liang-Ju | 385/60 |

FOREIGN PATENT DOCUMENTS

| | | | |
|---|---|---|---|
| EP | 0 232 792 A1 | 1/1987 | 385/53 X |
| EP | 0 570 652 A2 | 11/1993 | 385/53 X |
| EP | 0 599 784 A1 | 6/1994 | 385/53 X |
| EP | 0 613 030 A2 | 8/1994 | 385/53 X |
| EP | 0 733 922 A1 | 9/1996 | 385/53 X |
| JP | 56-107206 | 8/1981 | 385/53 X |
| JP | 57-142607 | 9/1982 | 385/53 X |
| JP | 63-118707 | 5/1988 | 385/53 X |
| JP | 3-84801 | 8/1991 | 385/53 X |
| WO | WO 85/00588 | 4/1985 | 385/53 X |
| WO | WO 98/08122 | 2/1998 | 385/53 X |

OTHER PUBLICATIONS

Advertisement from a magazine called FDDI fiber Connector of Method Electronics, Inc., Fiber Optics Division, 7444 West Wilson Avenue, Chicago, Illinois.

Page 54 of *Fiberoptic Product News*, Apr. 1996.

Research Disclosure No. 275, Mar. 1987, p. 124 entitled "Fiber Optic Connector with Built-in Shutter."

* cited by examiner

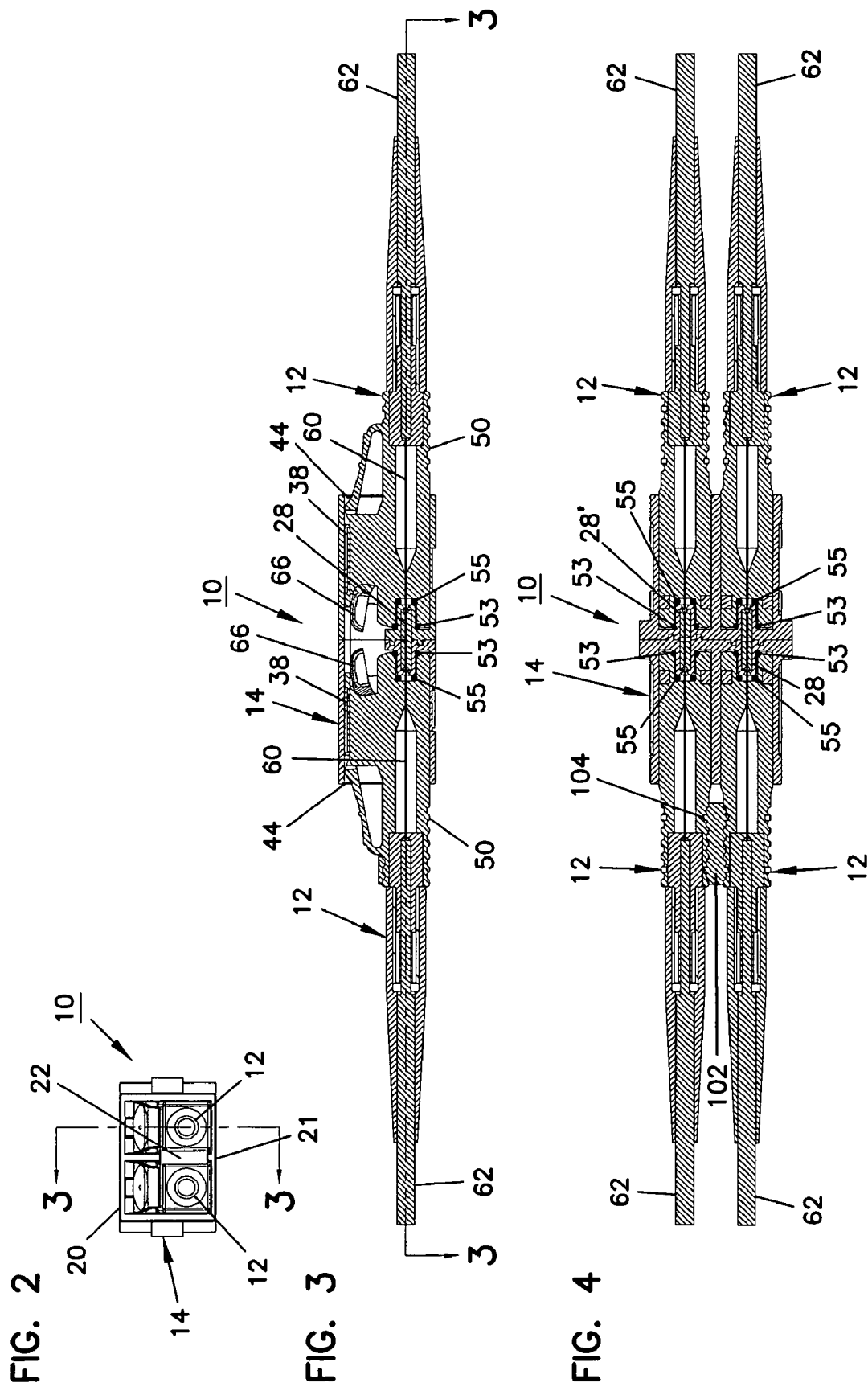

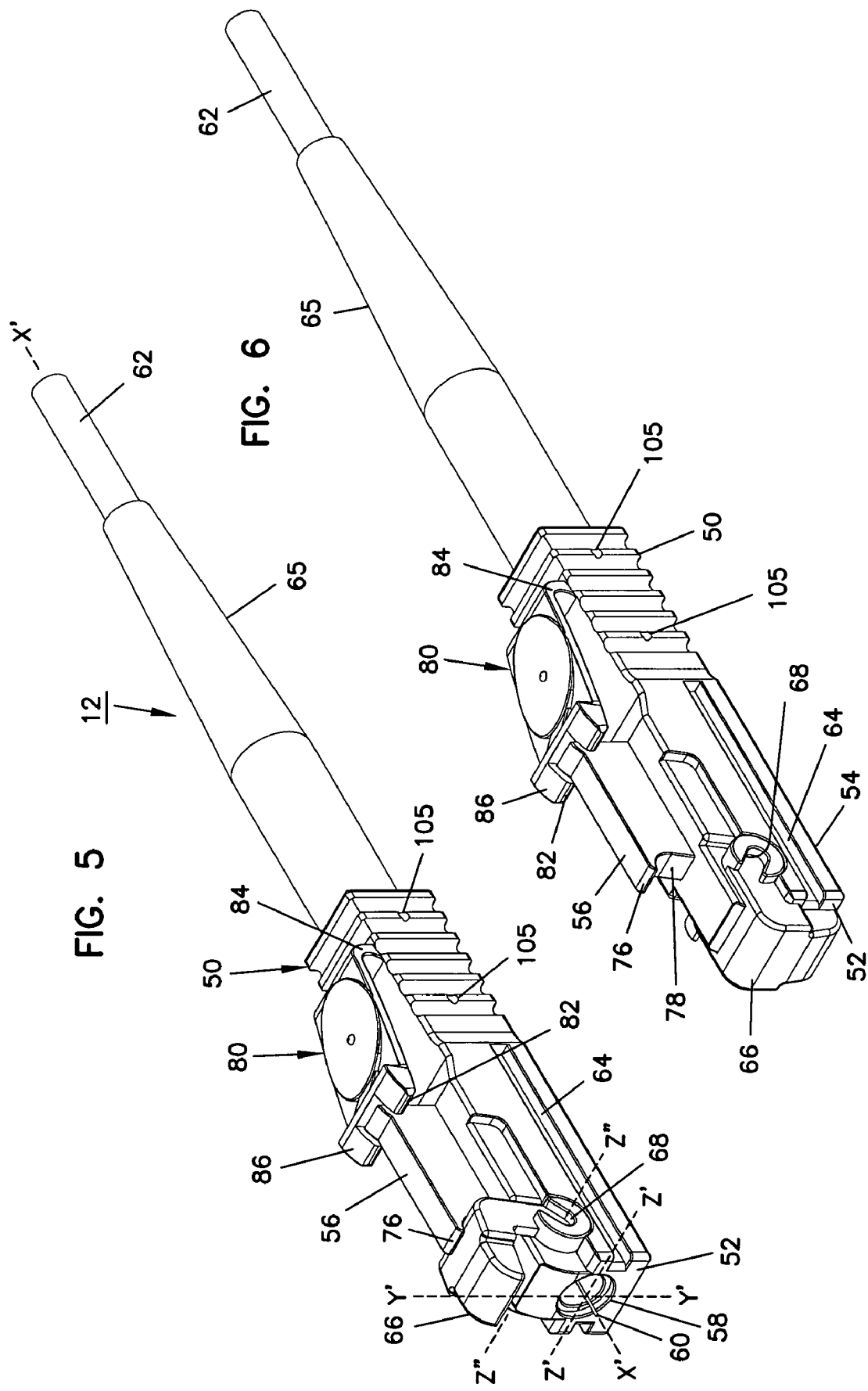

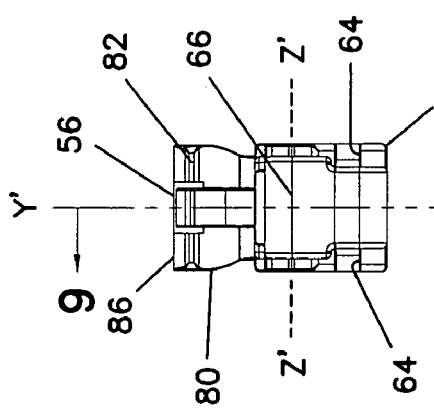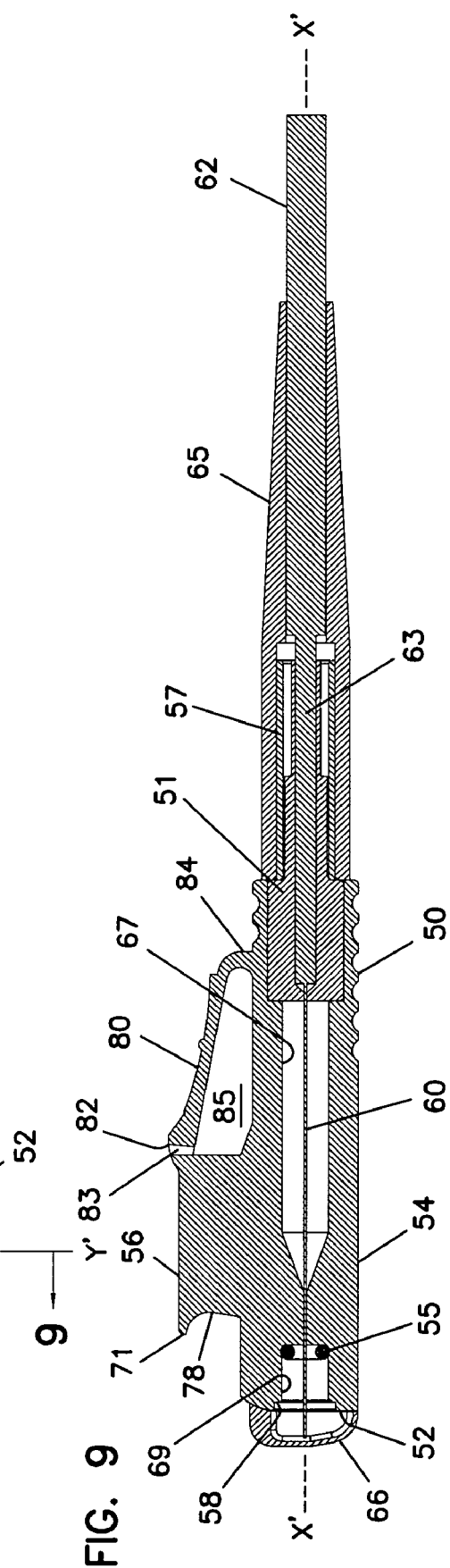

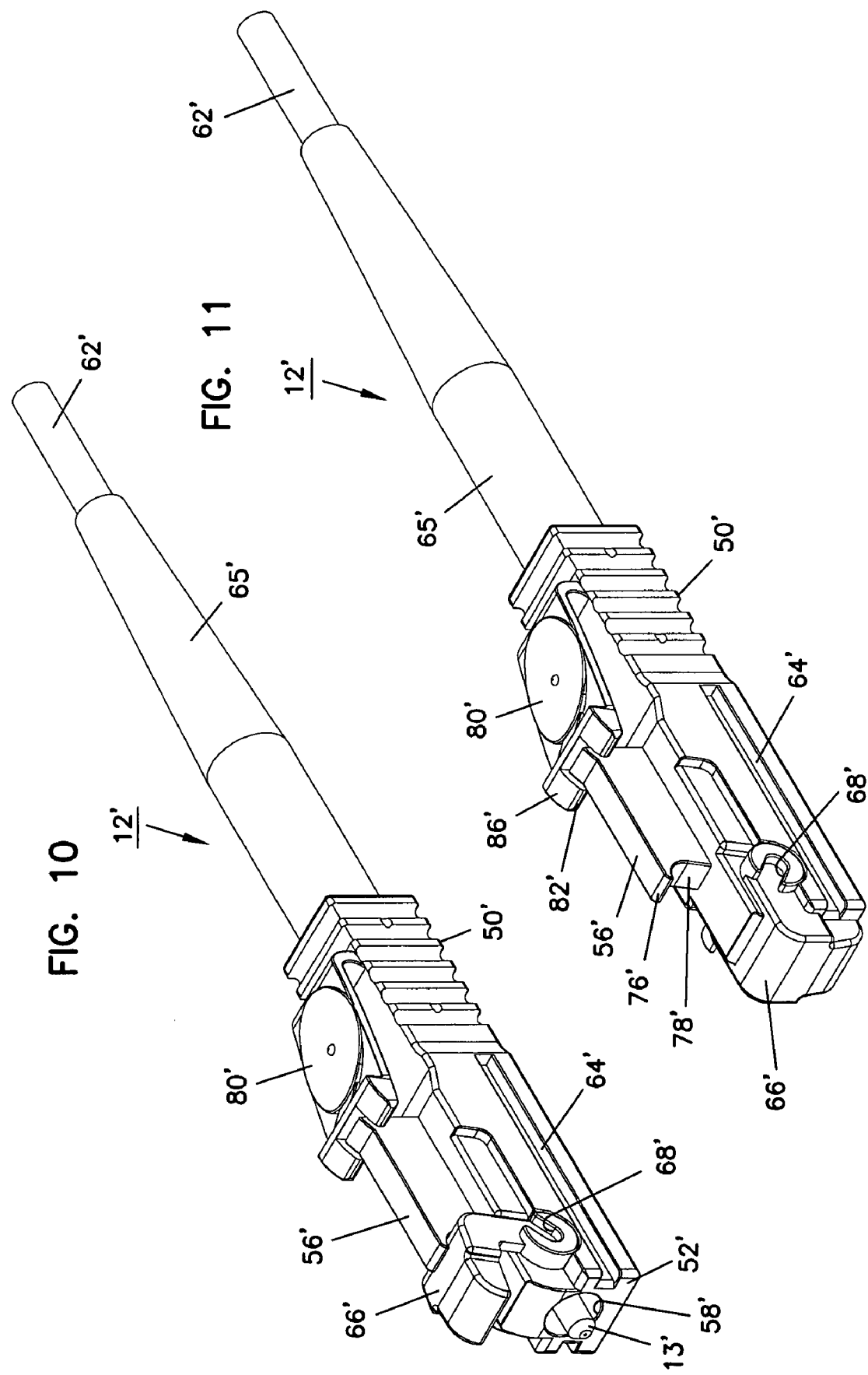

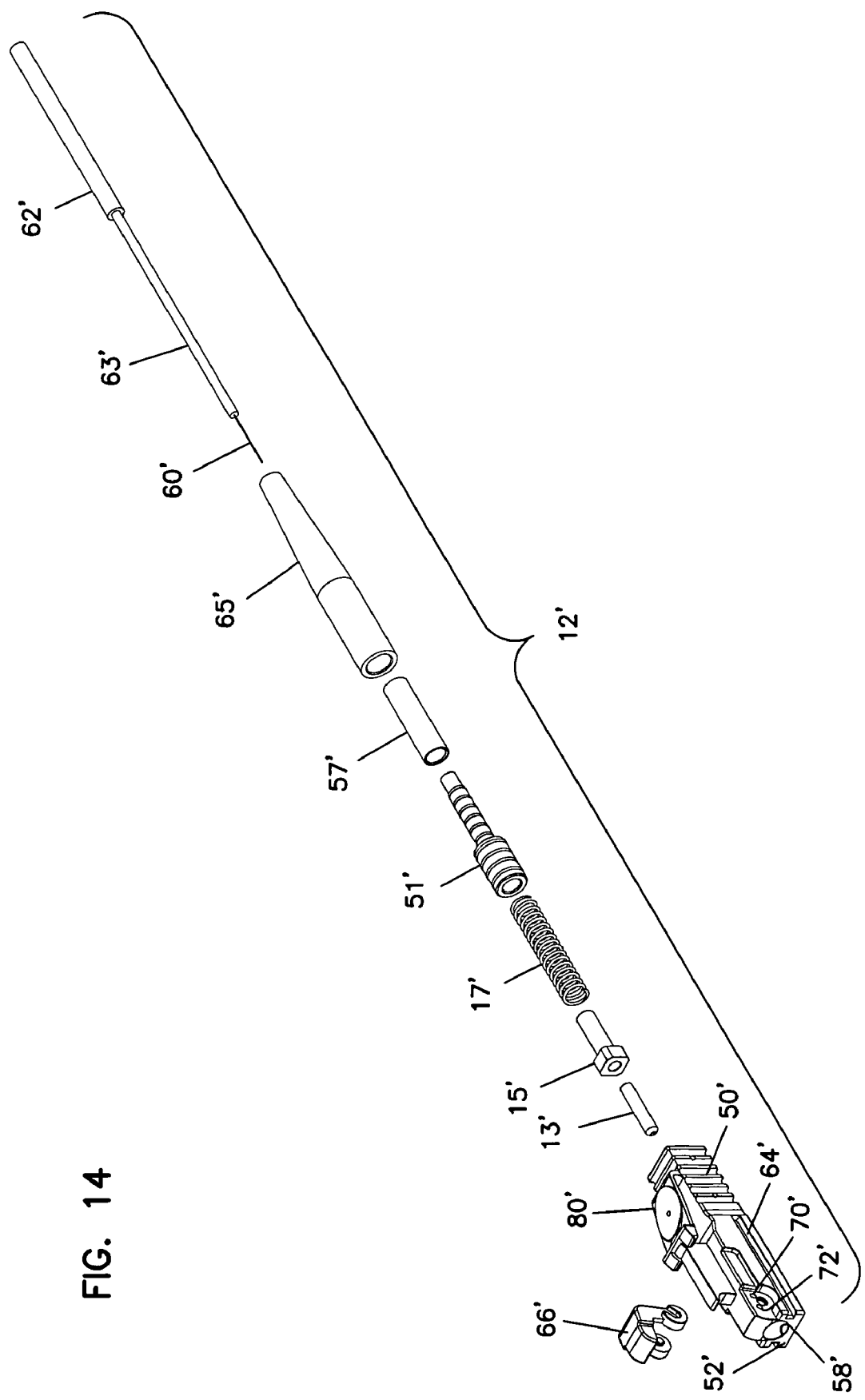

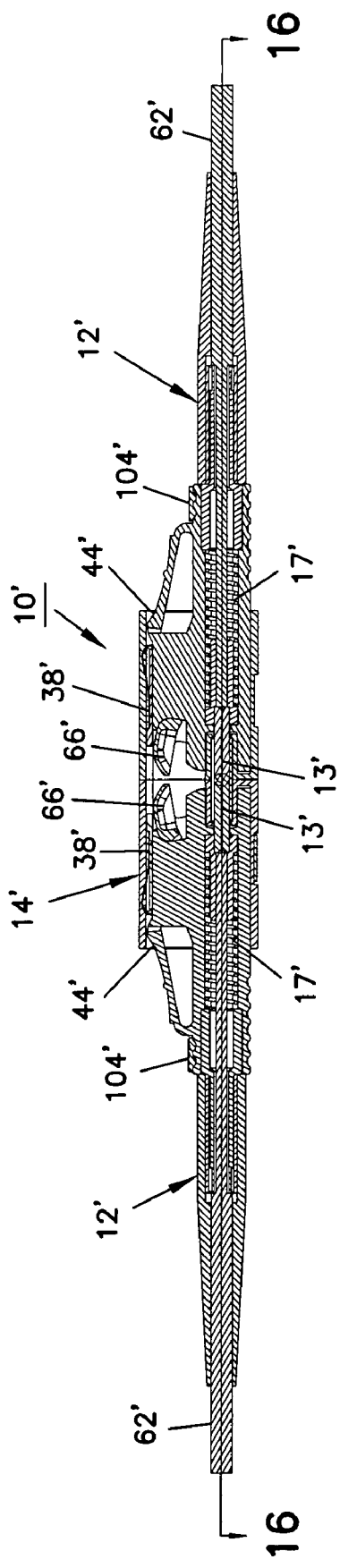

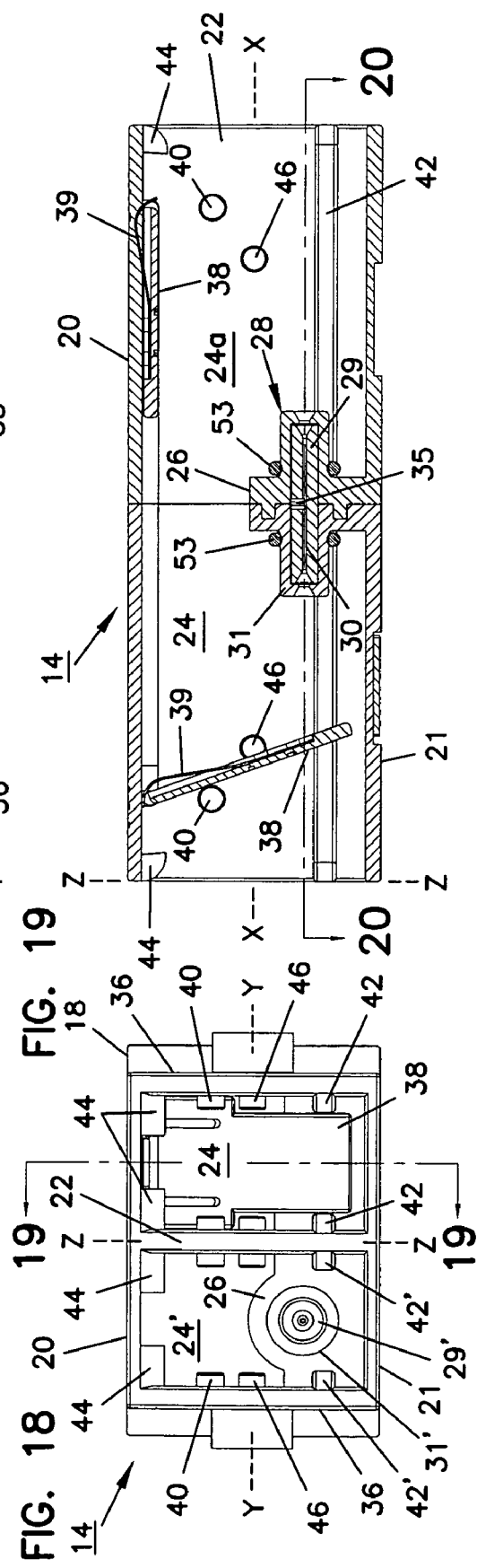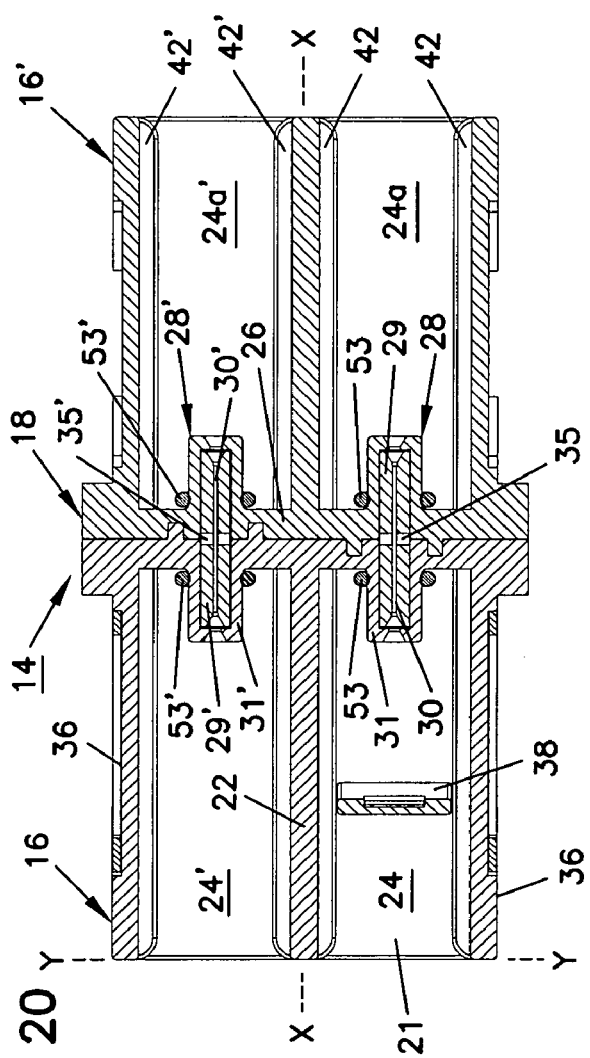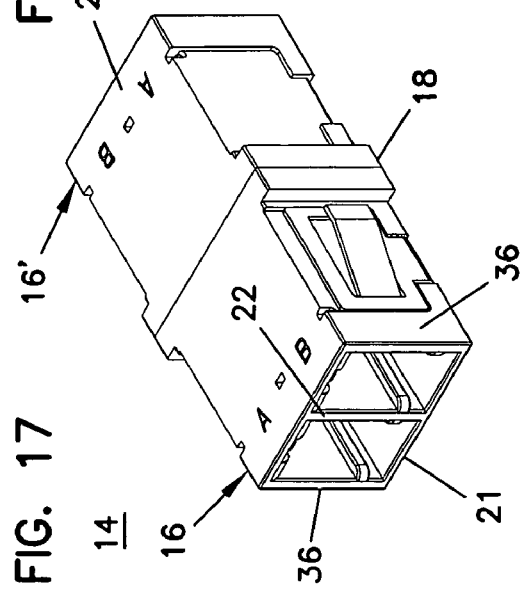

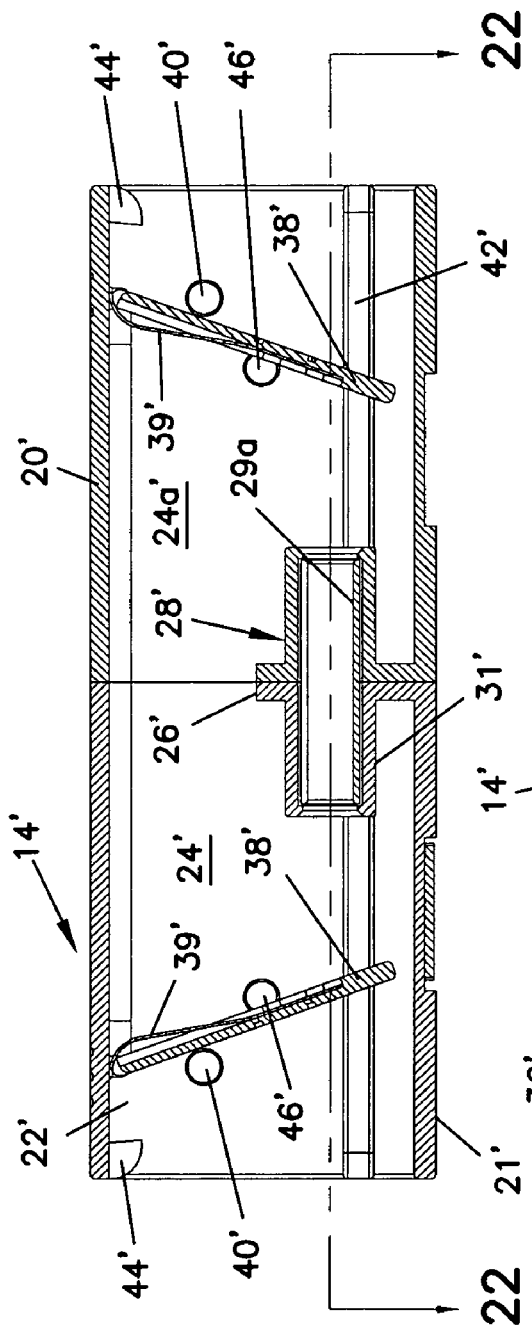
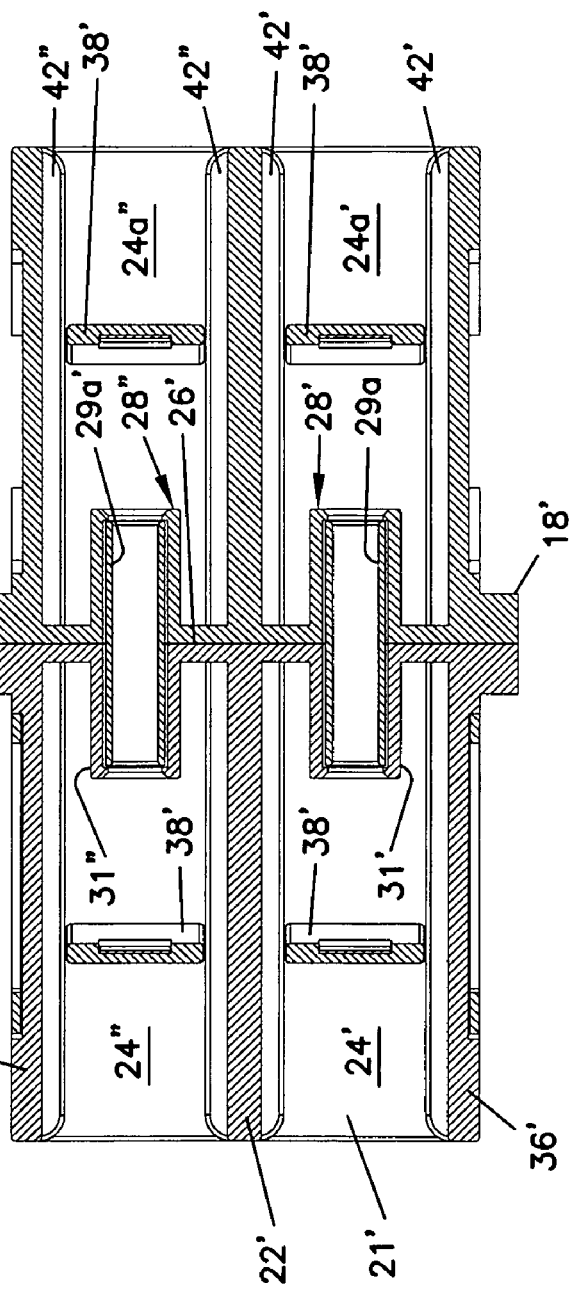
FIG. 21
FIG. 22

FIBER CONNECTOR AND ADAPTER

This application is a continuation of application Ser. No. 12/150,696, filed Apr. 29, 2008; now U.S. Pat. No. 7,503,702, which is a continuation of application Ser. No. 11/811,969, filed Jun. 12, 2007, now U.S. Pat. No. 7,384,201; which is a continuation of application Ser. No. 11/543,718, filed Oct. 5, 2006, now U.S. Pat. No. 7,246,950; which is a continuation of application Ser. No. 11/092,317, filed Mar. 29, 2005, now U.S. Pat. No. 7,118,288; which is a continuation of application Ser. No. 10/213,350, filed Aug. 5, 2002; now U.S. Pat. No. 6,910,807 which is a continuation of application Ser. No. 09/921,526, filed Aug. 3, 2001, now U.S. Pat. No. 6,471,416; which is a continuation of application Ser. No. 09/583,681, filed May 30, 2000, now U.S. Pat. No. 6,296,398; which is a continuation of application Ser. No. 09/394,303, filed Sep. 10, 1999, now U.S. Pat. No. 6,076,973; which is a continuation of Ser. No. 09/207,838, filed Dec. 8, 1998, now U.S. Pat. No. 5,984,531; which is a continuation of application Ser. No. 08/859,533, filed May 20, 1997, now U.S. Pat. No. 5,883,995; which applications are incorporated herein by reference.

I. BACKGROUND OF THE INVENTION

1. Field of the Invention

This invention pertains to connectors and adapters for optical fibers. More particularly, this invention pertains to such connectors and adapters which include end caps for covering an end of the connector or adapter when the connector is not inserted into a mating adapter.

2. Description of the Prior Art

Fiberoptic connectors historically presented exposed ends. Further, adapters which received such connectors presented exposed interior elements. The exposed ends and interior elements included the terminal ends of optical fibers. As a result, such terminal ends would be susceptible to impact damage or the like. Further, light transmitted through the optical fiber could inadvertently be directed into the eye of a technician or other person viewing the optical fiber or adapter.

The prior art has developed end caps for covering optical fibers when a connector is not in use. An example of such is shown in U.S. Pat. No. 5,348,487 to Marazzi et al dated Sep. 20, 1994. FIGS. 5 and 6 of the '487 patent illustrate two types of end caps which are pivoted to an open position as the end cap is placed within an adapter. FIGS. 7 and 8 illustrate an embodiment where a end cap 6 is pivoted to an open position and then slid rearwardly to expose a ferrule 5. An adapter for the connector is shown in FIG. 9. The adapter includes both an external housing 16 and an internal housing 15. The internal housing 15 includes a slot 30 which receives a pin 29 of the end cap 6. The slot 30 causes both the pivoting and the sliding action of the end cap 6 as the connector is placed within the adapter. Furthermore, the adapter includes an internal door 32 (shown in FIG. 10) which covers internal ferrules 2 when a connector 1 is removed from the adapter. Upon placement of a connector 1 into the adapter, the end cap is pivoted and slid to an open position and the door is pivoted to an open position. Further examples of such structures are found in U.S. Pat. Nos. 5,420,951 and 5,363,460. These patents show fiberoptic connectors to be joined in adapters. While not SC adapters, the adapters shown in these patents are sized to have cross-sectional profile (i.e., footprint) the same as so-called SC adapters. An SC adapter is shown in commonly assigned U.S. Pat. No. 5,317,663.

SC adapters are standard industry adapters having a fixed external size and geometry. The structure of the aforementioned '951, '487 and '460 patents provide end caps and internal doors for the purpose of blocking light or protecting elements in connectors. However, the manner in which such functions are achieved restricts the density of fiberoptic connectors. Namely, in those patents, only single pairs of connectors may be optically coupled within a single adapter. Within the industry, it is desirable to provide up to two pairs of connectors being optically coupled in a single adapter. It is an object of the present invention to provide protective covering and doors for connectors and adapters in a structure that permits two connectors pairs to be coupled in an adapter having the same size as a standard size SC adapter.

II. SUMMARY OF THE INVENTION

According to preferred embodiment of the present invention, a fiberoptic connector and adapter assembly comprises a fiberoptic connector with an optical fiber disposed within the connector housing. A cover is carried on the connector housing and pivots between an open and a closed position. In the closed position the cover closes an opening of the connector housing. In an open position, the cover exposes the opening. The connector housing includes a longitudinal guide aligned with a longitudinal axis of the connector housing. The cover further includes a cam pin receiving slot. The adapter includes an adapter housing sized to receive the connector housing. A fiber coupling mechanism is contained within the interior of the adapter to align with an optical fiber of an inserted connector. The adapter housing further includes a longitudinal guide which cooperates with the longitudinal connector guide to direct the connector into axial alignment with the adapter fiber coupling mechanism. The adapter housing further includes a cam pin disposed within the interior to be received within the cam pin receiving slot to urge the cover from a closed position to an open position as the connector housing is inserted into the adapter housing.

III. BRIEF DESCRIPTION OF THE DRAWINGS

FIG. 2 is an end elevation view of the connector/adapter assembly of FIG. 1;

FIG. 3 is a view taken along line 3-3 of FIG. 2;

FIG. 4 is a view taken along line 4-4 of FIG. 3;

FIG. 5 is a front, top and side perspective view of the connector used in the assembly of FIG. 1 with an end cap shown in an open position;

FIG. 6 is the view of FIG. 5 with the end cap shown in the closed position;

FIG. 8 is a front elevation view of the connector of FIG. 6;

FIG. 9 is a view taken along line 9-9 of FIG. 8;

FIG. 10 is a view similar to that of FIG. 5 showing an alternative embodiment of a connector which contains a ferrule;

FIG. 11 is the view of FIG. 10 with an end cap in an open position;

FIG. 14 is an exploded perspective view of the connector of FIG. 10;

FIG. 15 is the view of FIG. 3 with an alternative embodiment connector and adapter;

FIG. 16 is a view taken along line 16-16 of FIG. 15;

FIG. 17 is a perspective view of the adapter of the assembly of FIG. 1;

FIG. 18 is an end elevation view of the adapter of FIG. 17 with one door shown in a closed position;

FIG. 19 is a view taken along line 19-19 of FIG. 18;

FIG. 20 is a view taken along line 20-20 of FIG. 19;

FIG. 21 is the view of FIG. 19 showing an alternative embodiment adapter;

FIG. 22 is a view taken along line 22-22 of FIG. 21;

IV. DESCRIPTION OF THE PREFERRED EMBODIMENT

Figure 1:
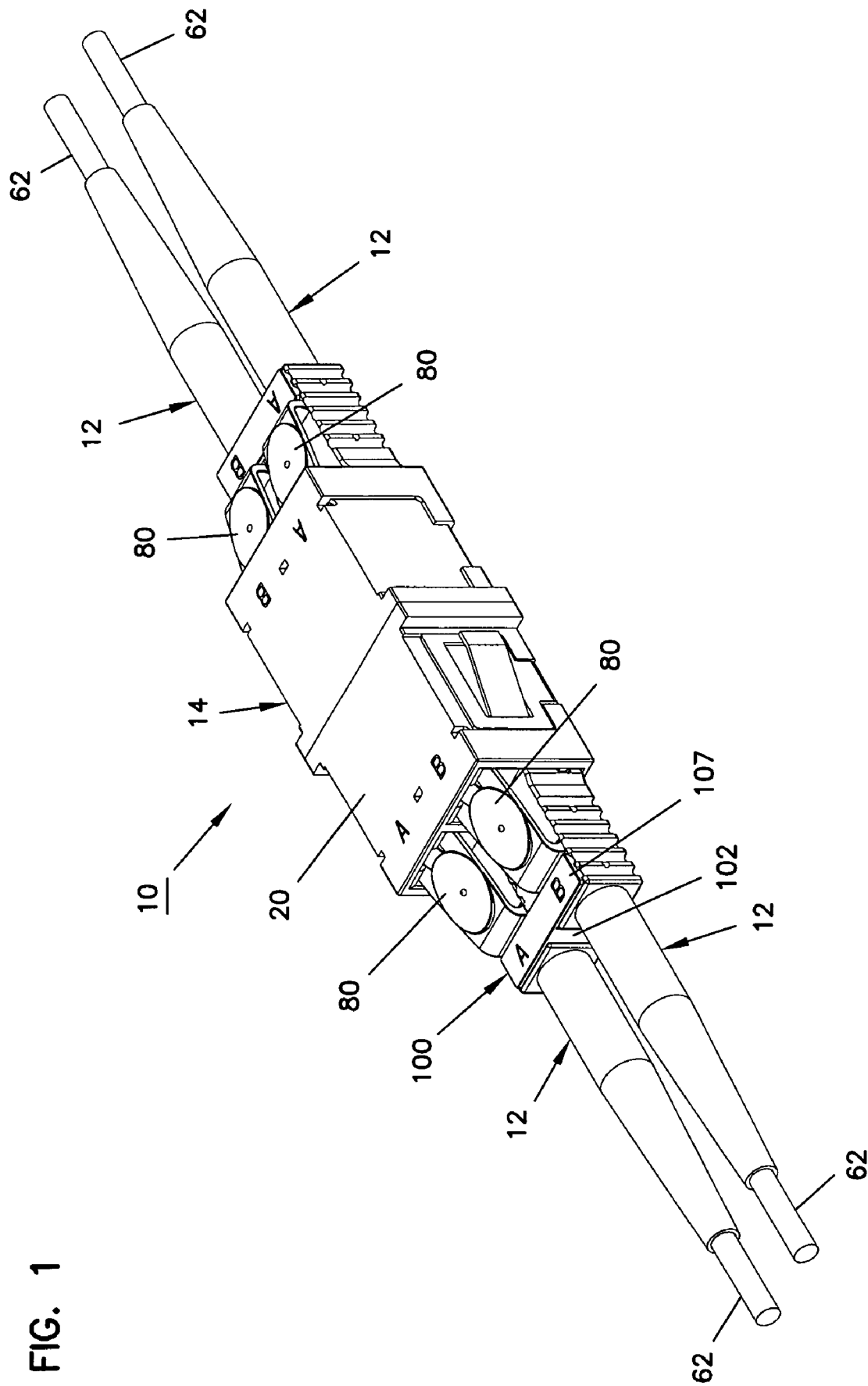
FIG. 1 is a perspective view of a connector/adapter assembly including an SC adapter containing two pairs of optically coupled connectors.

With initial reference to FIGS. 1-4, a connector/adapter assembly 10 is shown including four fiberoptic connectors 12 (each of identical construction) contained within a single adapter 14. The external geometry of the adapter 14 is the same as that shown in U.S. Pat. No. 5,317,663. In other words, the cross sectional area of the adapter 14 is identical to that of a standard SC adapter such as that shown in U.S. Pat. No. 5,317,663 so that the adapter 14 may be inserted into preexisting applications which received the prior SC adapter of U.S. Pat. No. 5,317,663.

The adapter 14 is separately shown in FIGS. 17-20 to which attention is now directed. The adapter 14 includes two halves 16, 16' joined at a flange 18. The flange 18 may be placed within a sheet metal support so that multiple adapters 14 can be positioned in side-by-side alignment on a sheet metal panel. Preferably, when the halves 16, 16' are joined, the part line between the halves 16, 16' is ultrasonically welded so that the halves 16, 16' form an inseparable and solid adapter 14.

The top and bottom walls 20, 21 and sidewalls 36 of the adapter define an adapter housing having an longitudinal axis X-X. The adapter 14 presents a generally rectangular cross section perpendicular to axis X-X and including a major transverse axis Y-Y and a minor transverse axis Z-Z. An interior wall 22 extends along the longitudinal axis X-X and perpendicular to the major transverse axis Y-Y. The wall 22 divides the interior of the adapter housing into first and second chamber pairs 24, 24a and 24', 24a'. Connectors inserted within opposing chambers 24, 24a are optically coupled. Similarly connectors inserted into opposing chambers 24', 24a' are optically coupled.

The chambers 24, 24' are separated from the opposing chambers 24a, 24a' by interior wall segment 26 containing fiber coupling mechanisms 28, 28'. In the embodiments of FIGS. 17-20 the fiber coupling mechanism 28, 28' is a micro capillary sleeve 29, 29' contained within a cylindrical housing 31, 31'. The micro capillary sleeves 29, 29' have internal bores 30, 30' for receiving an optical fiber. The micro capillary sleeves 29, 29' are aligned with their axes being parallel to the longitudinal axis X-X and centrally positioned (relative to the major transverse axis Y-Y) within the chambers 24, 24'. The micro capillary sleeve includes a reservoir 35, 35' for receiving an index matching fluid to provide index matching between opposing optical fibers inserted into bores 30, 30'. An O-ring 53, 53' surrounds the exterior of the cylindrical housing 31, 31' at wall 26. The O-ring 53, 53' is sized with an outer diameter greater than a diameter of a forward opening 58 (FIG. 5) of the connector 12.

The use of micro capillary sleeves 29, 29' contained within the adapter 14 is for use with so-called ferruleless connectors such as those shown in FIGS. 1-4. It will be appreciated that the present invention is also applicable to connectors which contain ferrules. In such an embodiment, the fiber coupling mechanism 28 is not a micro capillary sleeve but will include a split sleeve 29a, 29a' for receiving ferrules contained on the connectors. Such an embodiment is illustrated in FIGS. 21-22.

Figure 12:
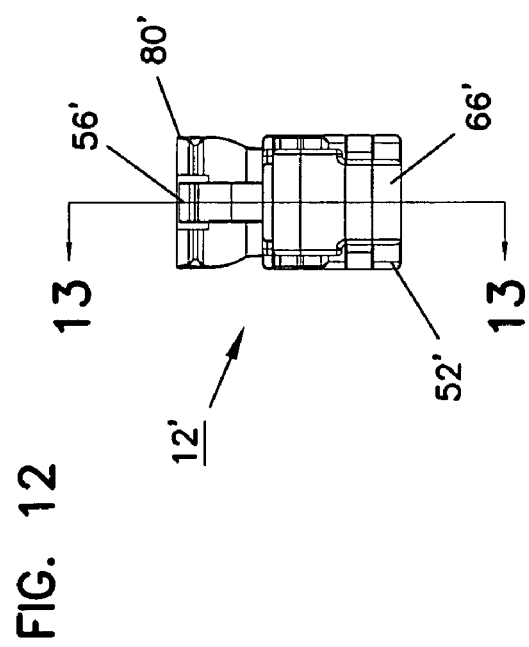
FIG. 12 is an end elevation view of the connector of FIG. 11.
Figure 13:
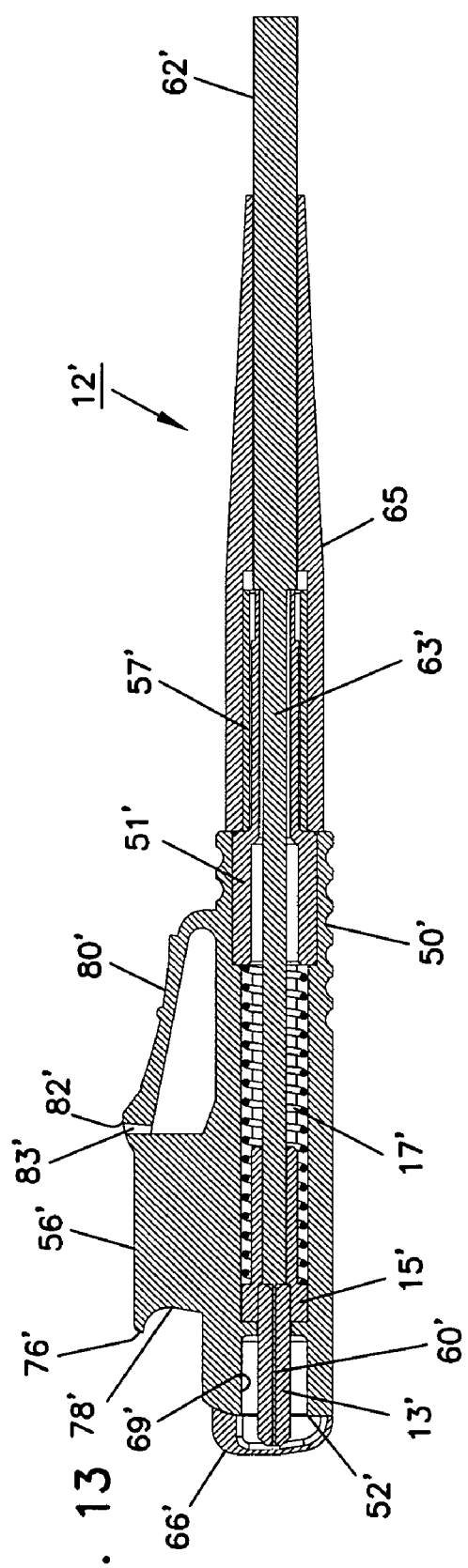
FIG. 13 is a view taken along line 13-13 of FIG. 12.

Doors 38 are pivotally secured to the upper wall 20 to pivot between an open position (shown on right hand side of the adapter in FIG. 18) and a closed position (shown on the left hand side of FIG. 18). The doors 38 are sized such that in the closed position, the doors 38 block direct visual inspection through the open ends of the adapter 14 to the fiber coupling mechanisms 28. As a result, in an event a fiberoptic connector is connected to one side of the fiber coupling mechanism 28 (e.g., the right side of FIG. 12), the closed door 38 on the opposite sides prevents a technician from looking directly at light on the opposite side of the fiber coupling mechanism 28. The doors 38 are spring loaded to the closed position shown in FIG. 38 by springs 39. Stop posts 40 contained on opposing interior surfaces of the walls 36, 22 limit the movement of the doors 38 past the open position.

The adapter 14 also includes longitudinal adapter guides 42, 42' in the form of longitudinally extending rails which extend parallel to the longitudinal axis X-X in close proximity to the lower wall 21. At the open ends of the adapter 14, the upper wall 20 is provided with internally extending protrusions 44 for the purpose of locking a connector in place as will be described. Also, the opposing interior surfaces of the walls 36, 22 include cam pins 46 for purposes that will be described. The doors 38 included cut out sides such that as the door 38 pivots to the closed position, the door 38 is free to pass both the cam pins 46 and the longitudinal adapter guides 42.

With reference to FIGS. 5-9, the connector 12 includes an outer connector housing 50. The connector 50 has a longitudinal axis X'-X' and a front end 52 having a major transverse axis Y'-Y' and minor transverse axis Z'-Z' (FIG. 8). The major transverse axis Y'-Y' extends from a base wall 54 to a top edge 56. The front end 52 includes a connector opening 58 through which a terminal end of an optical fiber 60 extends. The optical fiber 60 is an extension of an optical fiber carried in an optical cable 62 connected to the connector 12.

Within connector 12, the fiber 60 passes through a mandrel 51 and a crimp 57 to define two crimp zones for crimping on the cable's reinforced fiber (not shown) and internal 9 mm fiber 63. A strain relief boot 65 surrounds the mandrel 51 and cable 62. The interior of the housing 50 includes an internal cavity 67 (FIG. 9) to permit small amounts of displacement of fiber 60 as opposing fibers butt within the micro capillary sleeves 29 as opposing connectors 12 are optically coupled.

To increase return loss, the fiber 60 is angularly cleaved. When opposing fibers 60 are mated in the index matching fluid within micro capillary sleeves 29, 29', the angular mating surfaces can be slightly overlapped (for example, by several microns). The mechanical stress induced by connecting optical fibers can be reduced by the elastic properties of the fiber 60 accommodated by cavity 67.

The hole 58 at front end 52 is an entrance to a cylindrical chamber 69 (FIG. 9) sized in close tolerance to the outer diameter of the adapter's cylindrical housing 31. An O-ring 55 is contained within chamber 69. O-ring 55 is sized with an outside diameter greater than the internal diameter of chamber 69. The inside diameter of O-ring 53 is smaller than the outside diameter of cylindrical housing 31. The outside diameter of O-ring 53 is greater than the diameter of opening 58. As shown in FIGS. 3 and 4, when connector 12 is fully inserted, O-ring 53 is squeezed into opening 58. At the same time, O-ring 55 is squeezed. The O-rings 53, 55 keep any moisture or water from penetrating the optical coupling. With reference to FIGS. 3 and 4, it will be appreciated that O-rings 53, 55 cooperate to provide circumferential and axial seals.

The housing 50 is sized to be received within any one of chambers 24, 24a, 24', 24a' of the adapter 14. The connector 12 includes a longitudinal connector guide in the form of longitudinally extending slots 64 on opposite sides of the connector housing 50. The slots 64 are parallel to the longitudinal axis X'-X' and are spaced from the lower wall 54. The slots 64 are positioned to receive the guide rails 42, 42' when the connector 12 is inserted into the adapter 14 with the base 54 abutting the lower wall 21 and with the major transverse axis Y'-Y' of the connector 12 in parallel alignment with the minor transverse axis Z-Z of the adapter 14.

A cover 66 is pivotally secured to the connector housing 50 to pivot about an axis Z"-Z" which is parallel to axis Z'-Z' and spaced rearwardly of the front face 52. FIG. 5 shows the cover 66 in an open position exposing the opening 58 and the fiber 60. FIG. 6 shows the connector 12 with the cover 66 pivoted to a closed position closing the opening 58 and covering the fiber 60.

The cover 66 includes a cam pin receiving slot 68 positioned at the axis Z"-Z". As will be more fully described, the slot 68 is positioned to receive the pin 46 when the cover 66 is in the closed position as the connector 12 is inserted into the adapter 14. The pin 46 rotates the cover 66 to the open position at which point the pin 46 exits the slot 68 upon further insertion. Removal of the connector 12 from the adapter 14 reverses the action so that the pin 46 causes the cover 66 to pivot to the closed position.

Figure 7:
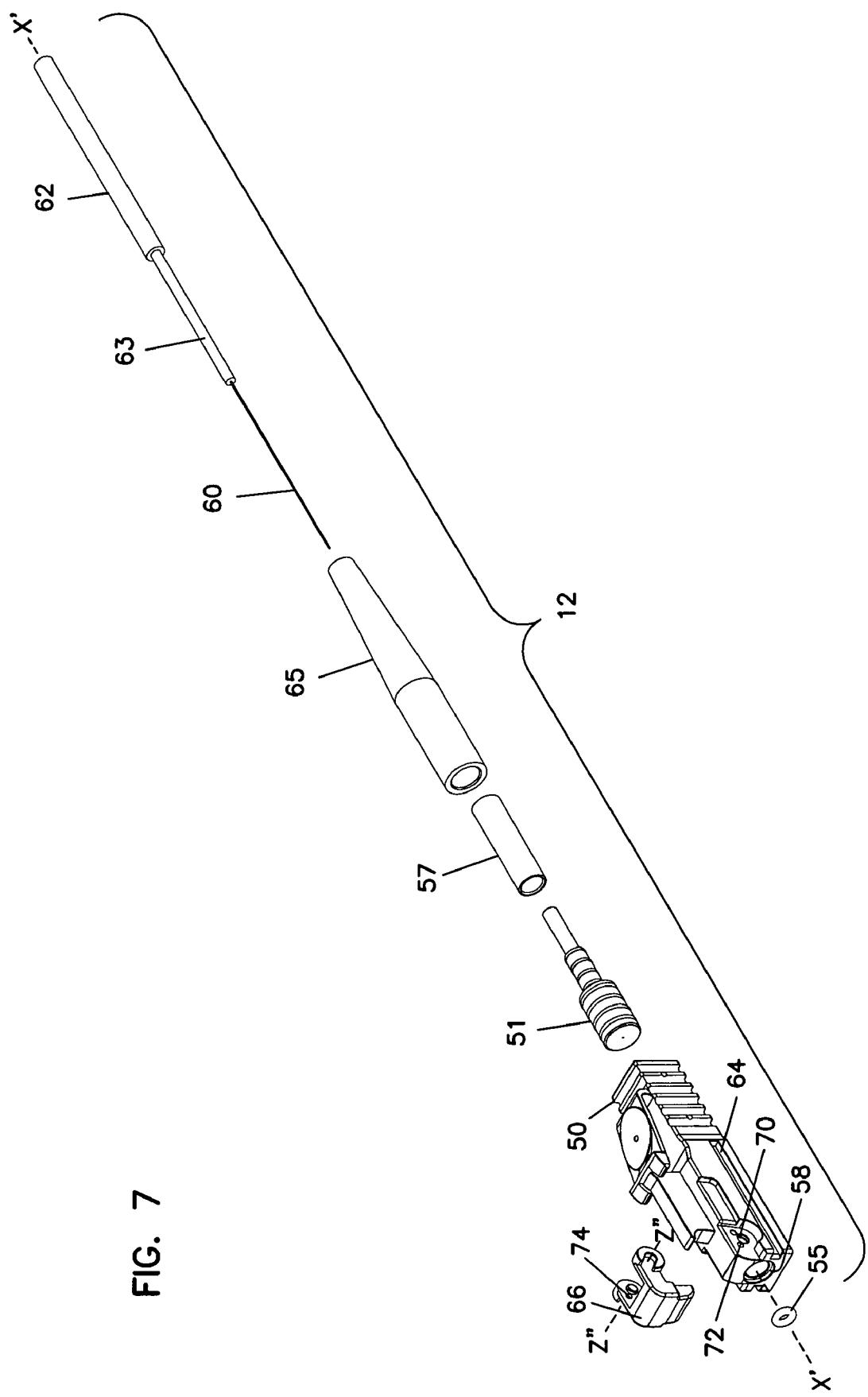
FIG. 7 is an exploded perspective view of the connector of FIG. 5.

As shown in FIG. 7, the housing 50 includes two detents 70, 72. The cover 66 includes a pin 74. The detents 70, 72 and pin 74 are mutually positioned such that the pin 74 is received within the detent 72 when the cover 66 is in the closed position. The pin 74 is received within the detent 70 when the cover 66 is in the open position. Positioning of the pin 74 within the detents 70, 72 acts to hold the cover 66 in a fixed position (i.e., either held in an open or closed position).

The edge 56 includes a forwardly protruding cam surface 76 and a cut out portion 78. The cam portion 76 is disposed to engage the cover 38 as the connector 12 is inserted into the adapter 14. The cut out 78 is sized to receive the pivoted cover 66 when the connector 12 is fully inserted into adapter 14 and the cover 66 is in a full open position.

With prior art connectors, latches have been provided to secure a connector to an adapter. However, such latches commonly included voids into which fibers could migrate and become caught or lodged. The present invention utilizes a connecting clip 80 having a free end 82 and an end 84 secured to the housing 50. The free end 82 is positioned between the front end 52 and the end 84 such that the cantilevered clip 80 points forwardly. The clip 80 includes a ramp surface 86 at the free end 82 to engage the protruding ledges 44 of adapter 14 when fully inserted. Depression of the clip 80 frees the ramp edge 86 from the ledges 44 so that the connector 12 can be removed.

The rails 42 are received within the slots 64 to guide and direct the connector 12 in the desired direction of travel along axis X'-X'. The free end 82 includes a cutout to permit the free end 82 to pass the edge 56 in close tolerance (indicated by spacing 83 in FIG. 9) such that opposing surfaces of the edge 56 and free end 82 are separated by a spacing 83 smaller than the diameter of the cable 62. Accordingly, cable 62 cannot migrate inadvertently into the volume 85 (FIG. 9) defined between the opposing surfaces of the connector housing 50 and the clip 80.

With the construction thus described, two connectors 12 may be placed side by side into an adapter 14. As a result, the connectors 12 may be individually moved or inserted. From time to time, it may be desirable to couple adjacent connectors 12 so that they are simultaneously inserted or removed. A coupling clip 100 (FIGS. 1-4) is provided. The clip 100 includes a body portion 102 sized to match a spacing between adjacent connector housings 50 and configured to mate with the opposing surfaces of the connector housings 50. Pins 104 (FIG. 4) protrude from the body 102 and project into holes 105 (FIG. 5) in the connector housings 50. The clip 100 further includes a cap 107 to span the upper surfaces of the adjacent connectors 12. As a result, the spacer 100 securely connects two connectors 12 so that they may be removed or inserted simultaneously. It will be appreciated that the spacer 100 is optional to permit connectors 12 to be individually or simultaneously removed or replaced at the option of a technician.

With the structure thus described, two connectors 12 may be placed in an adapter 14 having the same footprint of an SC adapter of prior art construction. Further, both of the connectors 12 include pivoting end caps 66 for covering the fiber 60 contained within the connector. The adapter 14 includes a pivoting door 38 for covering internal optical components and shielding such components from the eye of a technician.

The foregoing description pertains to a ferruleless connector 12 and mating adapter 14. The invention is also applicable to a ferrule-containing connector 12' and mating adapter 14'. These are illustrated in FIGS. 10-21. Elements of this embodiment in common with the first described embodiment are not separately described and are identically numbered with the addition of an apostrophe to distinguish the embodiments.

The connector 12' is separately shown in FIGS. 10-14. The adapter 14' is shown in FIGS. 21 and 22. FIGS. 15 and 16 show an assembly of the connector 12' and adapter 14'.

Unlike the connector 12, connector 12' contains a ferrule 13' axially positioned in chamber 69' and protruding beyond the front end 52'. The ferrule 13' is contained within a hub 15' biased from a mandrel 51' by a spring 17'. The fiber 60' passes through the ferrule 13'. The adapter 14' contains a split sleeve 29a, 29a' to receive ferrules 13' and align opposing ferrules 13' and fibers 60' in axial alignment. In all other material respects, connector 12 and 12' and adapters 14, 14' are identical.

The sequence of operation of the device is best illustrated in FIGS. 23-27. In the embodiment shown in FIGS. 23-27, a connector 12' containing an internal ferrule 13 (such as that shown in FIG. 13) is shown being inserted into an adapter 14'.

Figure 23:
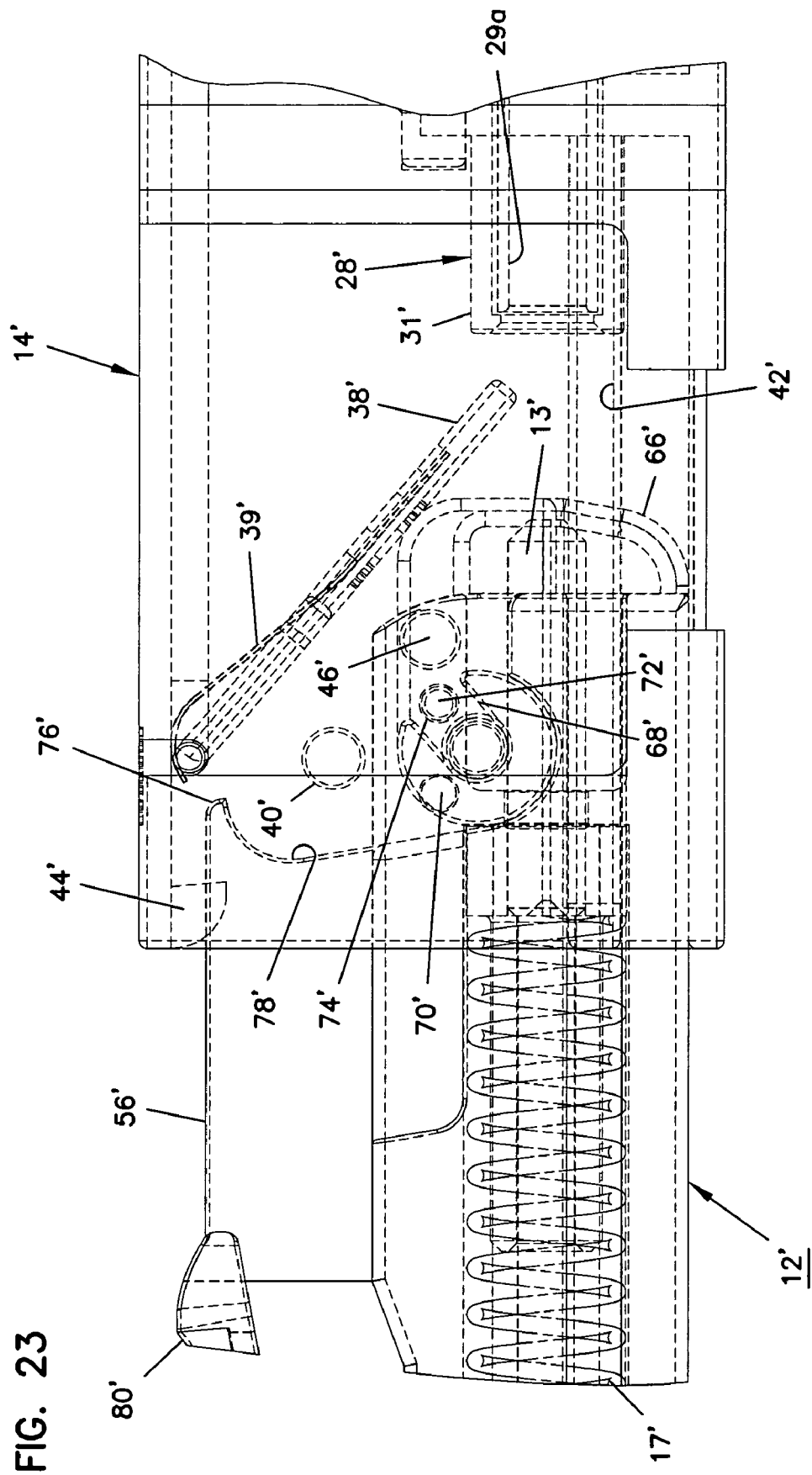
FIG. 23 is a side elevation view with internal elements shown in phantom lines of a connector of FIG. 11 being initially inserted into an adapter of FIG. 21.
Figure 24:
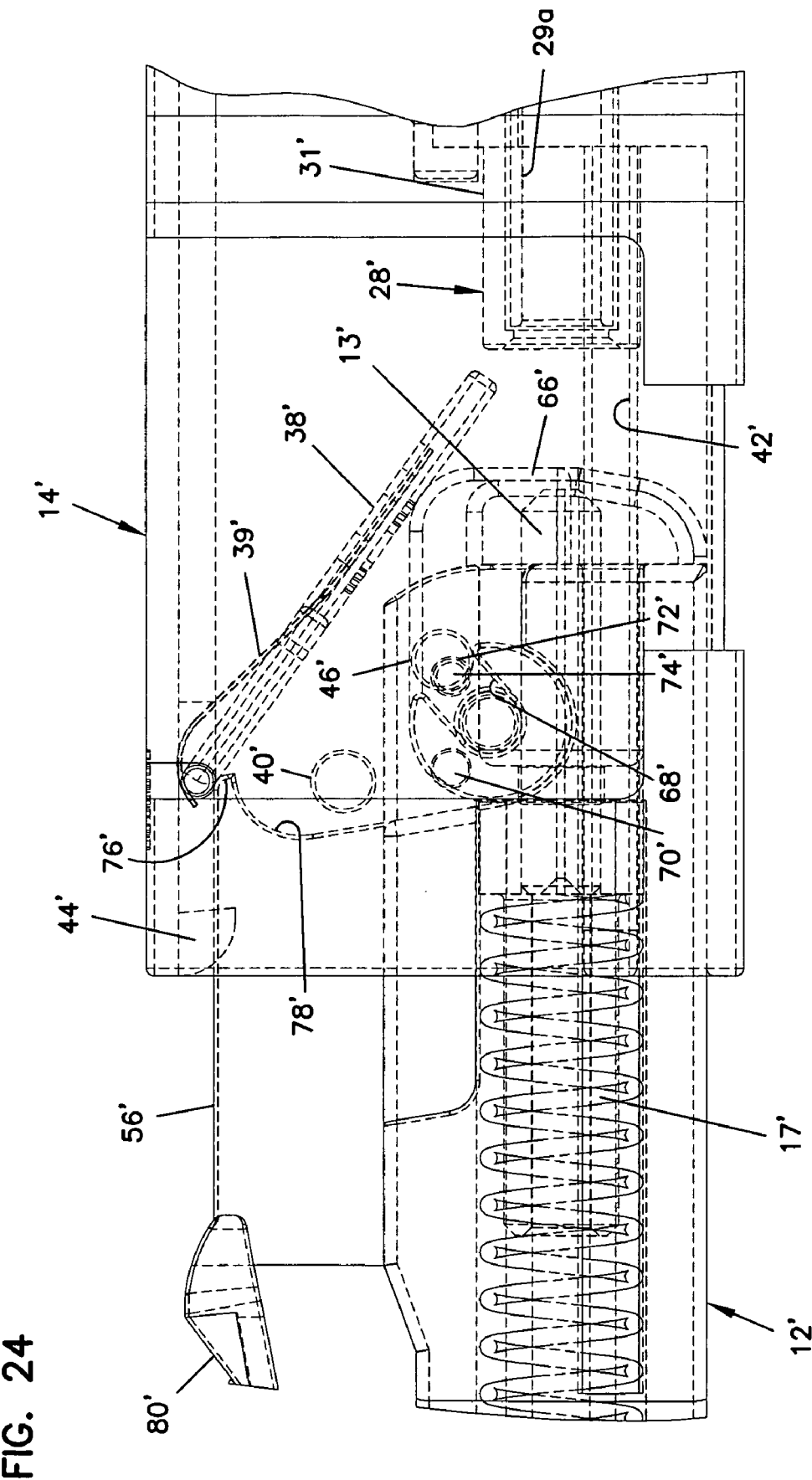
FIG. 24 is the view of FIG. 23 showing additional insertion of the connector to a point where an end cap is about to pivot toward an open position.

In FIG. 23, the connector 12' is first inserted into the adapter 14'. The cover 66' is in the closed position and has moved the door 38' to cause the door 38' to pivot. The pin 46 is not yet received in the slot 68'. FIG. 24 shows further insertion where the pin 46 is just received in slot 68' but is not yet causing the connector cover 66' to pivot. The cam 76' is positioned to engage door 38'.

Figure 25:
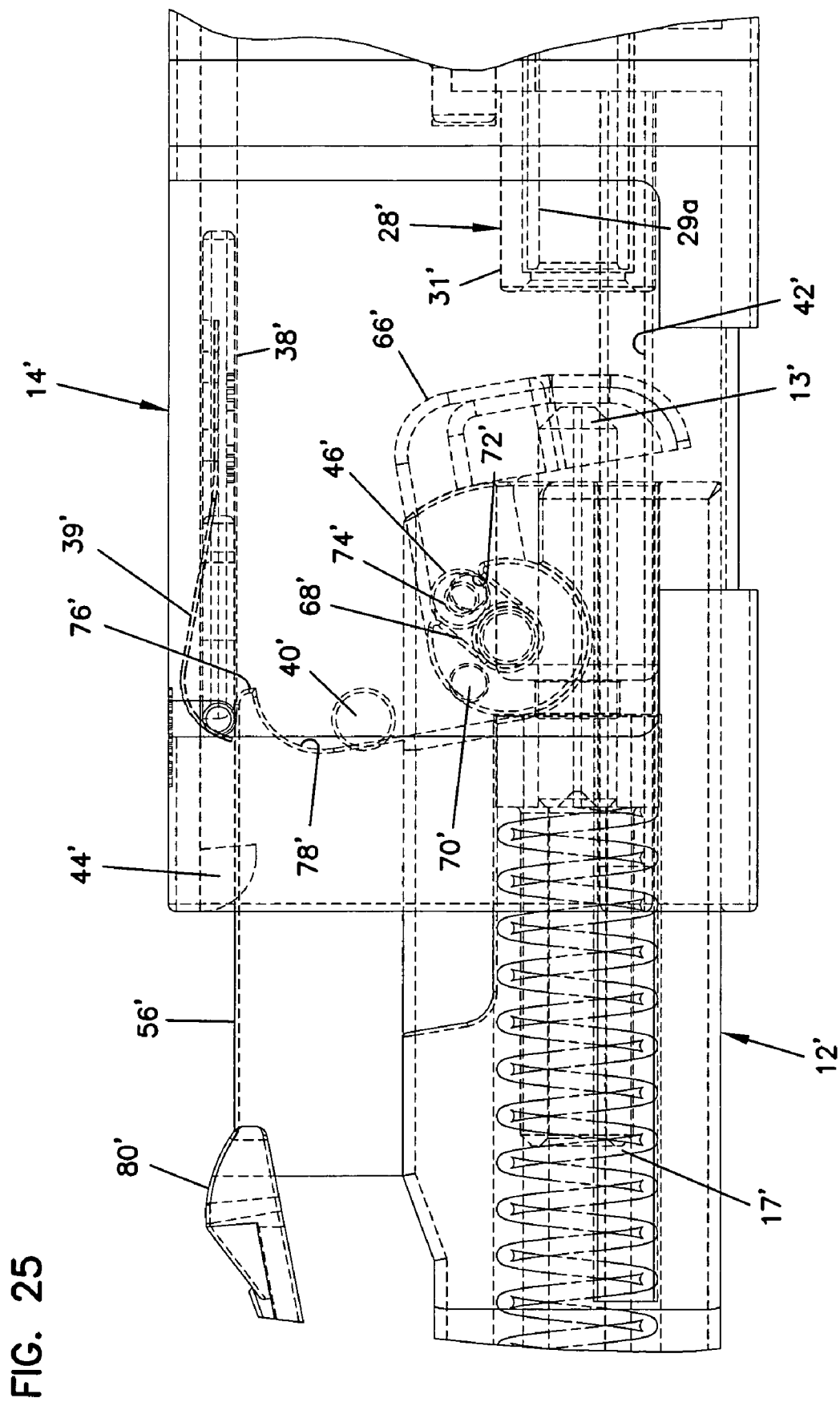
FIG. 25 is the view of FIG. 24 showing still further insertion of the connector to a point where an internal door of the adapter is shown in the fully open position and the end cap is not yet to a fully open position.

Upon further insertion, the view of FIG. 25 is attained where the cam edge 76' is engaging the door 38' to cause the door to pivot to an open position such that the cover 66' is free for pivotal movement. At this point, the pin 46' is urging against the slot surfaces 68' to cause the cover 66' to pivot. As the cover 66' pivots, the pin 74' moves out of the detent 72'.

Figure 26:
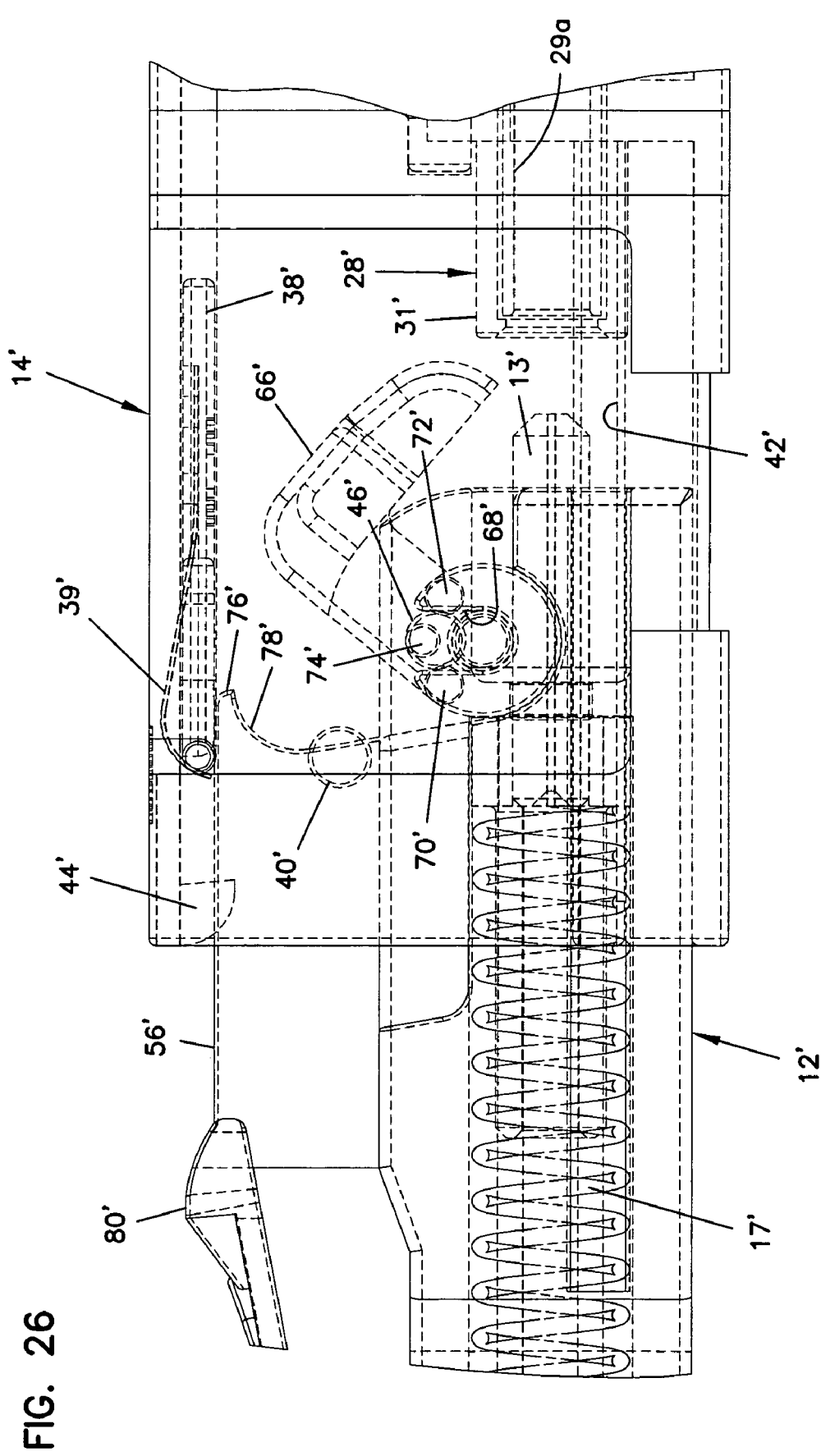
FIG. 26 is the view of FIG. 25 showing still further insertion where the door is about halfway pivoted.

Still further insertion is illustrated in FIG. 26 where the cam edge 76' retains the door 38' in the open position and where the cover 66' is not yet at a full open position but the ferrule 13' is exposed and aligned with the coupling mechanism 28'. At this point, the cover 66' is halfway through its full rotational movement as illustrated by the pin 74' being halfway between the detents 70', 72'.

Figure 27:
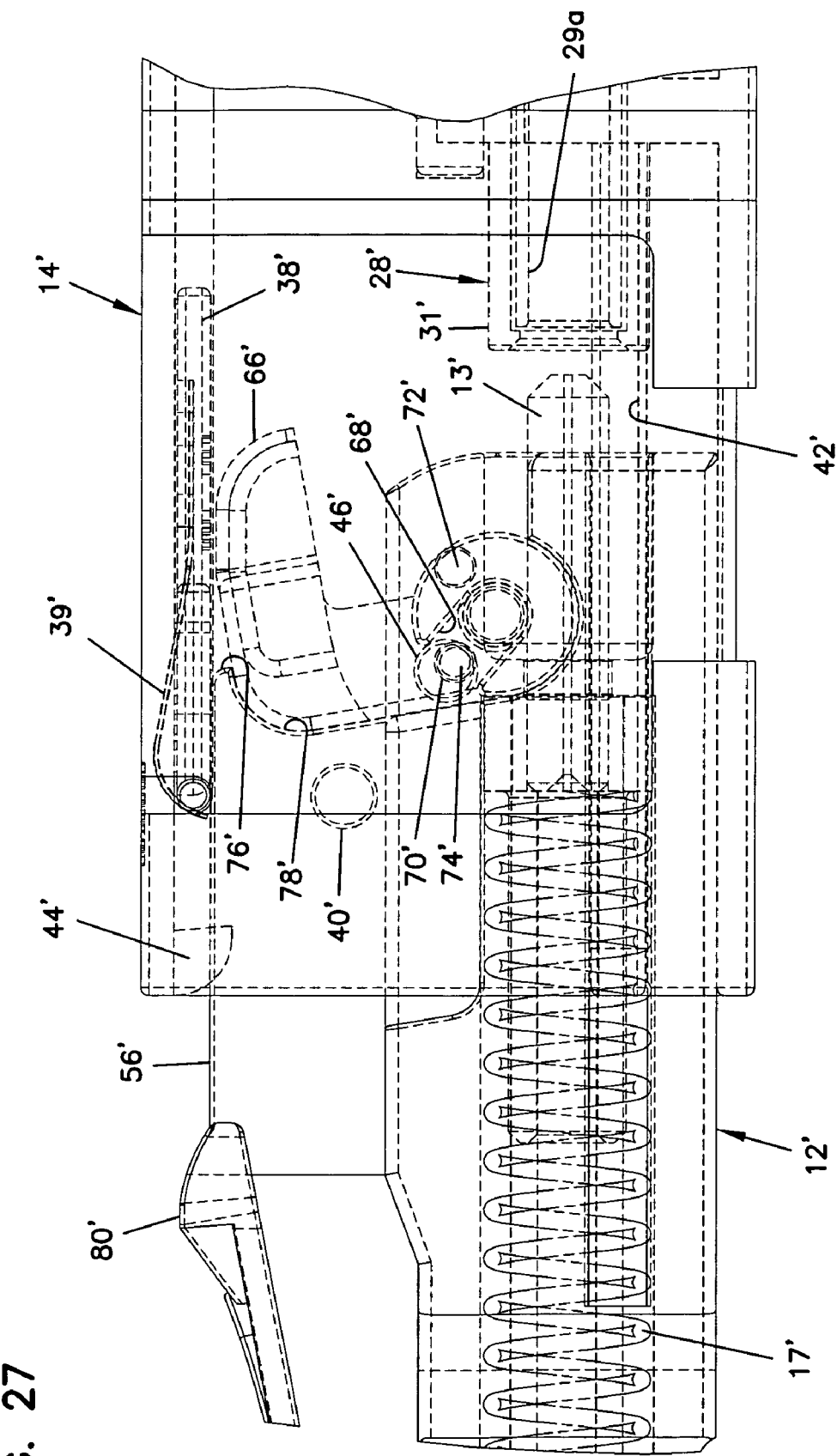
FIG. 27 is the view of FIG. 26 showing yet further insertion of the connector into the adapter with both the door of the adapter and the end cap of the connector shown in fully open positions.

FIG. 27 shows still further insertion where the cover 66' has been moved to its full open position with the pin 74' received within the detent 70' and with the cover 66' snugly received within the detent 78'. Further insertion of the connector 12' at this point causes the ferrule 13' to be passed into the fiber coupling mechanism 28 and for the clip ramp surface 86' to slide under and be captured by the retaining edges 44'. Upon depression of the clip 80', the connector 12' can be removed reversing the sequence of operation and causing the pin 46' to rotate the cover 66' to the fully down position. The spring 39 causes the door 38' to pivot to a closed position.

The foregoing details of the description of the present invention illustrates how the novel combination of novel connector and adapter achieve the functions of a cover of the end of the connector and a door within the adapter as well as permitting a design which permits two connectors to be fitted in side-by-side relation in a single SC adapter having the same cross sectional area as prior art SC adapters. Accordingly, the density is doubled over the density of prior art connectors having covers such as those shown in the aforementioned U.S. Pat. No. 5,363,460.

What is claimed is:

1. A method of assembling a fiberoptic connector assembly, comprising the steps of:
   a) providing an adapter defining two parallel chambers, each chamber defining opposite open ends, and further providing a fiber coupling mechanism located within each chamber of the adapter, the adapter having an exterior that defines an SC adapter footprint;
   b) providing a plurality of connectors each having a leading end, and an optical fiber disposed within the connector, the optical fiber having a terminal end exposed through the leading end of the connector, each connector including a retaining clip;
   c) inserting the leading end of at least two connectors into the opposite open ends of one of the two parallel chambers;
   d) coupling the terminal ends of the optical fibers of the inserted connectors with the fiber coupling mechanism located within the one chamber; and
   e) engaging the retaining clip of each connector with the adapter to secure the connectors within the open ends of the one chamber.

2. The method of claim 1, wherein the step of providing the adapter includes providing an adapter having an internal divider that defines the two parallel chambers.

3. The method of claim 1, wherein the step of inserting the leading end of the at least two connectors includes engaging a longitudinal slot formed on each connector with a projecting rail located within the one parallel chamber.

4. The method of claim 3, further including axial aligning the terminal end of the optical fiber of each connector with the fiber coupling mechanism as the connectors are fully inserted into the adapter.

5. The method of claim 1, wherein the step of providing the plurality of connectors includes providing connectors each having a cover, the method further including moving the cover from a closed position to an open position as the connector is being inserted within the chamber.

6. The method of claim 5, wherein the step of providing the adapter includes providing an adapter having a cam pin located adjacent to each of the opposite open ends of the two parallel chambers, the method further including engaging the cam pin with the cover to move the cover from the closed position to the open position.

7. The method of claim 6, further including exposing the terminal end of the optical fiber through the leading end of the connector by moving the cover to the open position.

8. The method of claim 7, wherein the step of moving the cover includes pivoting the cover about a pivot axis.

9. The method of claim 6, wherein the step of engaging the cam pin with the cover includes engaging the cam pin within a receiving slot, the receiving slot being arranged to receive the cam pin such that the cam pin urges the cover from the closed position to the open position as the connector is being inserted within the chamber.

10. The method of claim 5, wherein the step of moving the cover from the closed position to the open position includes moving the cover from a position forward of the terminal end of the optical fiber to a position rearward of the terminal end of the optical fiber.

11. The method of claim 5, wherein the step of providing the plurality of connectors includes providing connectors each having a pin element carried by the cover, the method further including engage the pin element with a detent formed in the chamber that holds the cover in the open position.

12. The method of claim 5, wherein the step of providing an adapter includes providing an adapter further including a door located adjacent each open end of the parallel chambers, the method further including pivoting the doors open as each connector is inserted within the chamber.

13. The method of claim 1, wherein the step of providing an adapter includes providing an adapter further including a door located adjacent each open end of the parallel chambers, the method further including pivoting the doors open as each connector is inserted within the chamber.

14. The method of claim 1, wherein the step of engaging the retaining clip includes engaging the retaining clip with a retaining edge formed on the adapter.

\* \* \* \* \*